(12) United States Patent
Serras

(10) Patent No.: US 7,205,472 B2
(45) Date of Patent: Apr. 17, 2007

(54) METHOD FOR MANUFACTURING THERMOELECTRIC CONVERTERS

(75) Inventor: Edouard Serras, 38 bis Boulevard d'Argenson, 92200 Neuilly sur Seine (FR)

(73) Assignees: Institut Francais du Petrole, Ruell Malmaison Cedex (FR); Edouard Serras, Neuilly sur Seine (FR)

( * ) Notice: Subject to any disclaimer, the term of this patent is extended or adjusted under 35 U.S.C. 154(b) by 700 days.

(21) Appl. No.: 10/433,003

(22) PCT Filed: Nov. 30, 2001

(86) PCT No.: PCT/FR01/03789

§ 371 (c)(1),
(2), (4) Date: May 29, 2003

(87) PCT Pub. No.: WO02/44676

PCT Pub. Date: Jun. 6, 2002

(65) Prior Publication Data

US 2004/0025930 A1    Feb. 12, 2004

(30) Foreign Application Priority Data

Dec. 1, 2000 (FR) .................... 00 15704

(51) Int. Cl.
H01L 35/34 (2006.01)

(52) U.S. Cl. ..................... 136/201; 136/225
(58) Field of Classification Search ............... 136/201, 136/225
See application file for complete search history.

(56) References Cited

U.S. PATENT DOCUMENTS 3,607,446 A * 9/1971 Sugarman et al. .......... 136/226
3,923,551 A * 12/1975 Purdy ........................ 136/201

FOREIGN PATENT DOCUMENTS

JP          10009969    * 1/1998

* cited by examiner

Primary Examiner—Nam Nguyen
Assistant Examiner—Anthony Fick
(74) Attorney, Agent, or Firm—Antonelli, Terry, Stout & Kraus, LLP.

(57) ABSTRACT

Method for manufacturing thermoelectric converters, consisting in weaving electroconducting threads (12, 14) of two different natures, parallel and arranged alternately, with threads (10) made of an electrically insulating material in moving the electroconducting threads together two by two at predetermined intervals, in welding them in their contact zones (20) and in cutting them at the level of the welds so as to obtain strips (34) comprising, on the longitudinal edges thereof, a large number of thermocouples connected in series.

17 Claims, 3 Drawing Sheets

METHOD FOR MANUFACTURING THERMOELECTRIC CONVERTERS

FIELD OF THE INVENTION

The present invention relates to a method for manufacturing thermoelectric converters comprising a plurality of thermocouples in series consisting of electroconducting threads of two different natures, and it also relates to the thermoelectric converters obtained by implementing this method.

BACKGROUND OF THE INVENTION

There are well-known thermoelectric converters consisting of a plurality of thermocouples connected in series, whose junctions at the opposite ends thereof are contacted respectively with a hot source and with a cold source to produce an electromotive force which depends on the temperature difference between the hot junctions and the cold junctions and on the number of thermocouples connected in series.

In order to increase the useful power produced by such a thermoelectric converter, one is generally led, among other things, to increase the number of thermocouples and therefore to seek manufacturing methods allowing to obtain, in an economical fast and reliable way, assemblies comprising a large number of thermocouples connected in series.

The aim of the invention is notably to answer these requirements.

SUMMARY OF THE INVENTION

It therefore provides a method for manufacturing thermoelectric converters comprising pluralities of thermocouples in series, made by weaving electroconducting threads of two different natures, parallel and arranged alternately, with threads made of an electrically insulating material, characterized in that it consists, at predetermined intervals along the electroconducting threads, in moving the electroconducting threads together two by two, in welding them in their contact zones and in cutting them at the level of the welds so as to obtain parallel cloth strips wherein the ends of the electroconducting threads are connected in series and form the junctions of the thermocouples.

In a preferred embodiment of the invention, the electroconducting threads are the weft threads and the threads made of an electrically insulating material are the warp threads.

The weaving method according to the invention is fast and allows, by arranging side by side a large number of warp threads, to form a plurality of parallel woven strips comprising each a plurality of thermocouples connected in series. The spacing of the insulating warp threads reduces the number thereof and facilitates weaving.

Advantageously, threads made of an electrically insulating material that does not slide on the electroconducting threads are inserted in the insulating threads at regular intervals. Their friction on the electroconducting threads allows these threads to be moved together and held in position for the welding and cutting operations, notably when the other insulating threads are made of glass fibers and slide easily on the electroconducting threads.

Preferably, the parts of the electroconducting threads which are welded two by two and cut to form the junctions of the thermocouples are between two of these electrically insulating and non-sliding threads which are separated by a predetermined distance, for example some millimeters, enough for welding and cutting of the electroconducting threads.

Advantageously, two electroconducting threads are moved together in the desired contact zone by passing them on the same side of one or two aforementioned threads made of an insulating and non-sliding material as the weft threads are introduced in the warp.

Welding of the electroconducting threads in their contact zones is preferably carried out by laser welding or by means of an electric arc. This welding operation can notably be performed automatically by passing the parts in contact with the weft threads between electrodes connected to an electric power supply, passage of the weft threads between the electrodes triggering an electric arc which welds and cuts the threads in contact.

Arranging two rows of electrodes on either side of the cloth consisting of the aforementioned warp and weft threads, in the direction of the weft, and by moving the cloth forward between these rows of electrodes allows to carry out automatically and simultaneously all the welding and cutting operations, on the same weft line, of the weft threads of all the woven parallel strips intended to form thermoelectric converters.

In a variant, welding of the weft threads is carried out by plasma welding or another technique.

After welding and cutting the electroconducting threads, the strips obtained are wound or folded and cut to the desired length after having been coated with a layer or a sheet of an electrically insulating and heat-resisting material, for example a glass fiber layer.

Before winding or folding, the welded ends of the weft threads can be coated with an electrically insulating product such as wax or a varnish for example. The thermocouple strip can then be wound or folded without being coated with an insulating layer or sheet.

The wound or folded strips are then placed in sheaths made of an electrically insulating and heat-resisting material, and the welded ends of the electroconducting threads are embedded in layers of electrically insulating and heat-resisting material.

In a variant, the wound or folded strips are vacuum impregnated with a thermally and electrically insulating material of ceramic type.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
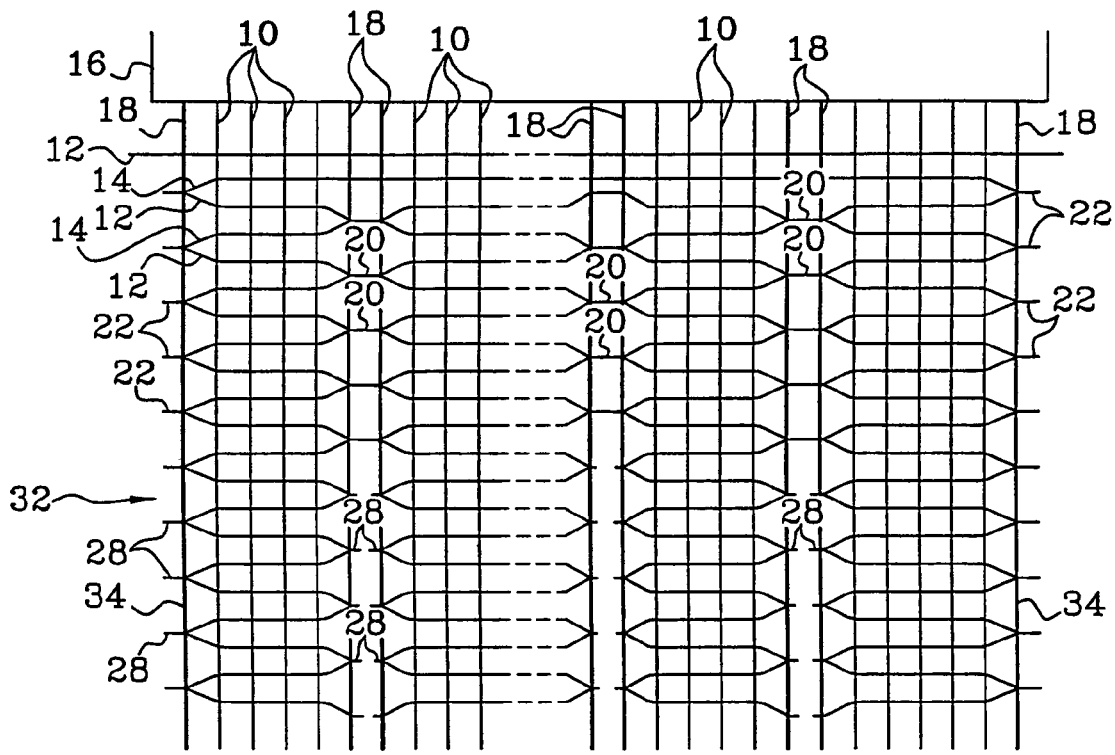
FIG. 1 diagrammatically shows the manufacture by weaving of the thermocouple strips according to the invention, FIG. 2 diagrammatically shows welding means.
Figure 2:
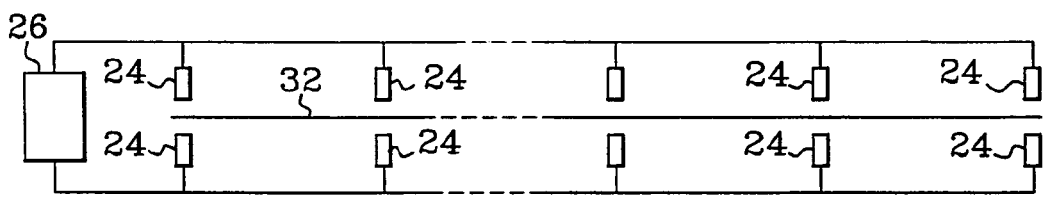
Figure 3:
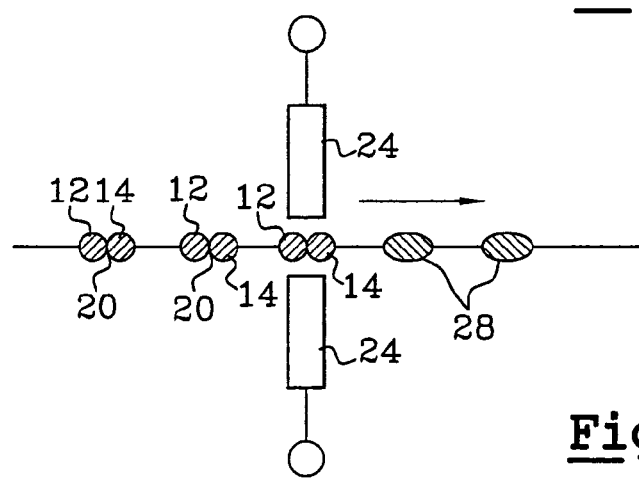
FIG. 3 is an enlarged partial view of the welding means.

FIG. 1 diagrammatically shows the main stages of a weaving method according to the invention, wherein warp threads 10 made of an electrically insulating material such as glass fiber are woven with electroconducting weft threads 12, 14 of two different natures, which are alternately introduced in the warp. These electroconducting threads 12, 14 are intended to be welded to one another at regular intervals over the total width of the cloth so as to form thermocouples in a plurality of parallel strips that extend through the length of the cloth and are juxtaposed crosswise through the width of the cloth.

During weaving, warp threads 10 are subjected to a predetermined constant longitudinal tension whereas weft threads 12, 14, which are alternately introduced in the warp, are cut outside the warp and have a length that is slightly greater than the weaving width so as to slightly stick out on either side of the warp.

In order to be welded together at regular intervals, the weft threads have to be moved together two by two in the desired welding zones.

According to the invention, this bringing together is achieved by means of warp threads 18 that preferably have a larger diameter, which are interposed at regular intervals in glass fiber threads 10 and which are made of an electrically insulating material that does not slide on weft threads 12, 14, threads 18 being for example made of a plastic material such as polyethylene.

These threads 18 are woven with pairs of weft threads 12, 14 and not with individual weft threads, so that each warp thread 18 is passed on a pair of weft threads 12, 14, below the next pair of weft threads 12, 14, on the next pair of weft threads 12, 14, etc.

This weaving has the effect of bringing the two threads 12, 14 of a pair of weft threads together as a result of the longitudinal tension applied onto thread 18, of its larger diameter and of the absence of longitudinal tension of weft threads 12, 14. This bringing together causes the two weft threads 12, 14 to come into contact with each other at the point through which warp thread 18 passes.

In order to clearly delimit a welding zone for the two weft threads 12, 14 of a pair, two threads 18 can be advantageously provided side by side in the warp, as diagrammatically shown in FIG. 1, and welding can be carried out between the two threads 18.

The two weft threads 12, 14 of each pair are thus moved close together as shown at 20 in FIG. 1 between two successive warp threads 18.

At the lateral ends of the warp, the ends of weft threads 12, 14 are also brought together, as shown at 22, by a polyethylene thread 18, or by two successive threads 18 which are a predetermined short distance apart from one another.

Figure 4:
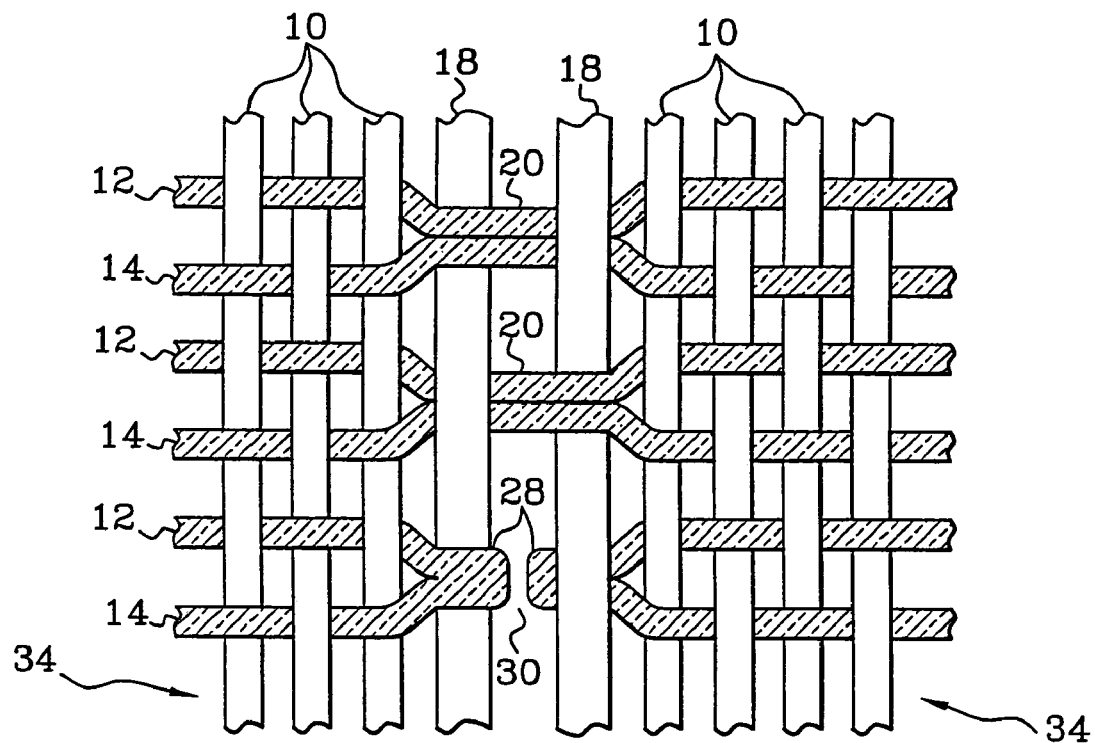
FIG. 4 is a large-scale partial view of a part of the cloth before and after welding.

As shown on a larger scale in FIG. 4, the two successive threads 18 which allow to bring two weft threads 12, 14 close together to form a contact zone 20 between the two threads can pass, for the first one, under the two threads and, for the second, over these two threads. As for the next pair of weft threads 12, 14, the first thread 18 passes over the two weft threads and the second one under them, and so on.

Figure 5:
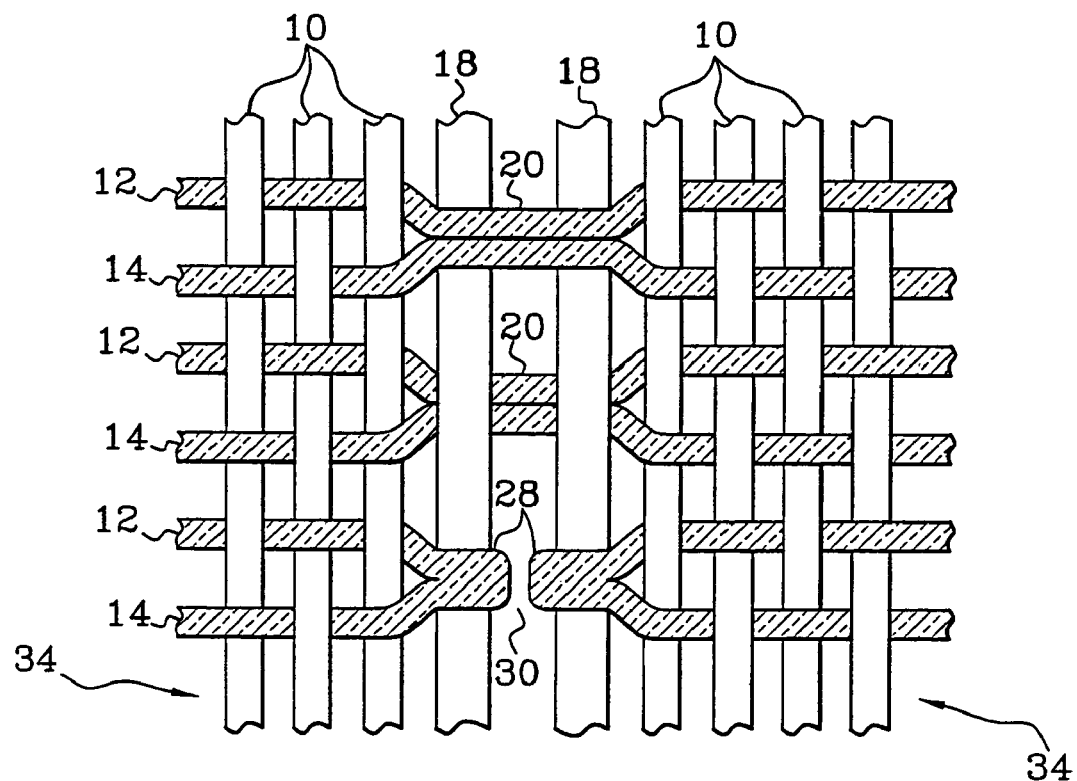
FIG. 5 is a view corresponding to FIG. 4 which shows an embodiment variant, FIG. 6 diagrammatically illustrates a final stage of the weaving operation according to the invention.
Figure 6:
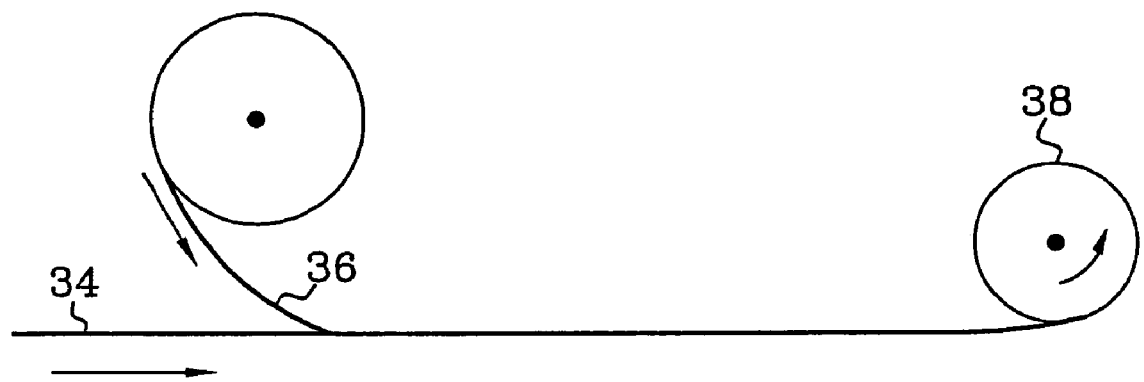

In the variant diagrammatically shown in FIG. 5, the two successive warp threads 18 both pass under a pair of weft threads 12, 14, over the next pair of weft threads 12, 14, and so on.

The next operation consists in welding the two weft threads 12, 14 of each pair in each of their contact zones 20, 22.

In this embodiment, welding is carried out by means of an electric arc triggered between two electrodes 24 connected to the terminals of an alternating-current power supply 26 with a peak voltage of the order of 500 V for example or more. Electrodes 24 are arranged one above and one below the passageway of the contact zones 20 of the weft thread pairs and the distance between them is such that no electric arc is triggered between electrodes 24 when no pair of weft threads 12, 14 is placed between these electrodes. On the other hand, passage of a pair of weft threads between the electrodes triggers an electric arc between the electrodes. This electric arc carries out welding of the two weft threads 12, 14 in their contact zone 20 (or 22) and simultaneously blows the median part of the welding zone, which has the effect of welding the two weft threads and of cutting them in the middle of the weld.

In the larger scale views of FIGS. 4 and 5, the welded parts of two weft threads 12, 14 are shown by reference number 28. They are separated by a void 30 which corresponds to the median part of the contact zone 20 of these two threads which has been blown by the electric arc.

Electrodes 24 are arranged in two parallel rows respectively above and below the cloth consisting of weft threads 12, 14 and warp threads 10, 18. These rows of electrodes extend parallel to the weft threads and include each a number of electrodes which is equal to the number of parallel strips of thermocouples in the cloth plus one.

In a variant, welding and cutting of weft threads 12, 14 is carried out by means of a laser beam produced by a computer-controlled generator.

Cloth 32 made up of the weft threads and the warp threads, which is transported beyond the welding means, consists of a plurality of parallel woven strips 34 which are separated and independent of one another.

Each woven strip 34 comprises a plurality of thermocouples formed by welds 28 at the ends of threads 12, 14 and connected in series along strip 34.

According to the invention, the predetermined short distance between warp threads 10, 18 simplifies weaving and reduces the cost of the thermocouple strips. For example, glass fiber warp threads 10 can have a diameter of the order of 0.3–0.5 millimeter, the distance between two successive threads 10 being approximately 2 to 5 millimeters. The diameter of warp threads 18 made of polyethylene or of a similar material is larger than the diameter of the weft threads, for example between 1.5 and 2 times their diameter, and the distance between two successive threads 18 is for example equal to the distance between two successive threads 10 or greater, if necessary, to facilitate welding of the weft threads.

These weft threads are for example wires having a diameter of the order of 0.15 millimeter, the distance between two successive metal threads 12, 14 being for example 0.6 millimeter.

The width of the strips 34 of thermocouples manufactured according to the invention can be adjusted for the applications for which these thermocouples are designed, and it is for example about 15 millimeters when their diameter is approximately 0.15 millimeter.

When the width of the cloth made up of the warp threads and the weft threads is approximately one meter, the number of parallel strips 34 of thermocouples manufactured simultaneously is about 66.

The interval between thermocouples on one side of a strip 34 being 1.5 millimeter and the weaving rate being 80 millimeters per minute for example, the method according to the invention allows to manufacture 66 strips comprising each 6400 junctions, i.e. 3200 thermocouples in series per weaving hour.

At the loom outlet, each strip of thermocouples 34 is coated with a strip 36 of an electrically insulating material having substantially the same width as the strip of thermocouples 34, this strip 36 consisting for example of a thin cloth or of a non-woven fabric of glass fiber or a similar material. The assembly consisting of the two strips 34 and 36 is then wound so as to form a coil or a roll 38 comprising thermocouples at its two axial ends.

In a variant, the assembly consisting of strips 34, 36 can be folded in a zigzag way instead of being wound.

According to another variant, in order to be protected against short-circuit risks upon winding or folding, the junctions formed by the welded ends of the weft threads can first be coated with an electrically insulating material such as a varnish or a wax. In this case, the layer of material that covers the junctions forms braces between the junctions when the strips are wound and/or folded, which prevents short-circuit risks between the junctions and makes insulating strips 36 useless.

Of course, thermocouple strips 34 are cut to the desired length depending on the application considered so as to form rolls 38 comprising a predetermined number of thermocouples in series and having a predetermined diameter.

Figure 7:
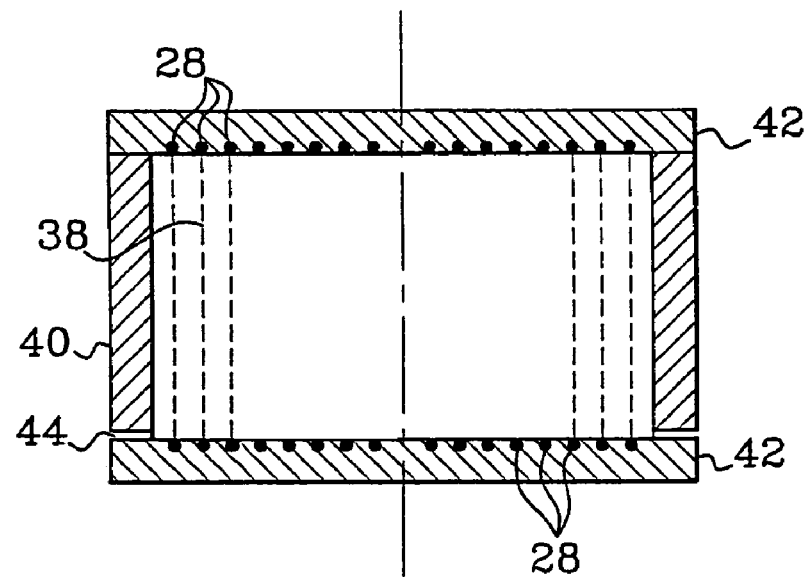
FIG. 7 is a diagrammatic axial view of a thermoelectric converter according to the invention.

As diagrammatically shown in FIG. 7, each roll 38 can then be placed in a sheath 40 made of an electrically insulating material and the thermocouples formed by the welded junctions 28 of the weft threads are embedded in a layer 42 of a thermally and electrically insulating material.

Advantageously, these layers 42 constitute radiators which allow the heat exchange between junctions 28 and the outside medium to be improved.

In a preferred embodiment of the invention, sheath 40 and layers 42 are made of ceramic.

It is advantageous for sheath 40 to be mechanically and thermally independent of layer 42 on the hot junctions side, i.e. the junctions that will be exposed to a high-temperature medium when the thermoelectric converter is in operation. In fact, this allows to take up the thermal expansion difference between sheath 40 and electroconducting threads 12, 14 which form the thermocouples of the converter. It also allows to form an air layer 44 between the layer of material 42 in which hot junctions 28 of the thermocouples are embedded and the corresponding end of sheath 40, and thus to reduce the heat transfer from sheath 40 to the layer of material 42 in which the cold junctions of the thermocouples are embedded.

Sheath 40, which is free in relation to layer 42 comprising the hot junctions, can be secured to layer 42 comprising the cold junctions.

In a variant, the coiled (or folded) strip 38, comprising an insulating strip 36 or not, is vacuum impregnated with a thermally and electrically insulating material of ceramic type, which is at a temperature ranging between approximately 150° and 700° C., depending on the circumstances, and which hardens on cooling. Welded junctions 28 are preferably embedded in layers 42 of a thermally and electrically insulating material of ceramic type before impregnating the coiled strip. In a variant, welded junctions 28 are embedded in the impregnation material that can form radiators like the aforementioned layers 42.

Of course, the method according to the invention can also be carried out with alternately arranged electroconducting warp threads and weft threads made of an electrically insulating material.

The invention claimed is:

1. A method for manufacturing thermoelectric converters comprising pluralities of thermocouples in series, said method comprising:
    weaving electroconducting threads of two different materials, parallel and arranged alternatively, with threads made of an electrically insulating material,
    moving the electroconducting threads together two by two in contact zones at predetermined intervals along the electroconducting threads so as to bring them in contact in the contact zones, and
    welding together parts of the two electroconductive threads that are in contact with one another in the contact zones and simultaneously cutting the welded electroconductive threads in the contact zones, so as to obtain parallel cloth strips independent from each other wherein each of which the welded ends of the electroconductive threads are connected in series and form the thermocouples.

2. A method as claimed in claim 1, wherein the electroconducting threads are the waft threads and the insulating threads are the warp threads.

3. A method as claimed in claim 2, further comprising interposing threads made of a plastic material that does not slide on the electroconducting threads, at regular intervals, in the threads made of the electrically insulating material.

4. A method as claimed in claim 3, comprising welding the electroconducting threads two by two between two threads made of a plastic material, which are separated from one another by a predetermined distance.

5. A method as claimed in claim 3, wherein the electroconducting threads are without longitudinal tension.

6. A method as claimed in claim 3, further comprising moving the two electroconducting threads to be welded together by passing them on the same side of a thread made of the plastic material.

7. A method as in claim 1, further comprising welding and cutting the electroconducting threads in their contact zones by means of an electric arc, or by laser welding or plasma welding.

8. A method as claimed in claim 7, further comprising passing cloth consisting of electroconducting threads and of insulating threads between two rows of electrodes connected to an alternating-current power supply, the electrodes being associated in pairs on either side of the contact zones of electroconducting threads.

9. A method as claimed in claim 1, wherein the insulating threads are spaced out in relation to one another.

10. A method as claimed in claim 1, wherein after welding and cutting the electroconducting threads, the woven strips are coated each with a strip made of an electrically insulating material and they are wound and/or folded.

11. A method as claimed in claim 10, wherein after winding and/or folding, the woven strips are placed in sheaths made of an electrically insulating and heat-resisting material, and the welded ends of the electroconducting threads are embedded in a layer of a heat-resisting and electrically insulating material.

12. A method as claimed in claim 11, wherein at least one layer of heat-resisting material in which the welded ends of the electroconducting threads are embedded is mechanically and thermally independent of said sheath.

13. A method as claimed in claim 10, wherein after winding and/or folding, the woven strips are vacuum impregnated with a thermally and electrically insulating material of ceramic type, and the welded junctions are embedded in layers of insulating material of ceramic type.

14. A method as claimed in claim 1, wherein at least the welded ends of the electroconducting threads are coated with an electrically insulating wax or varnish, and then the woven strips are folded and/or wound.

15. A method as claimed in claim 11, wherein after winding and/or folding, the woven strips are placed in sheaths made of an electrically insulating and heat-resisting material, and the welded ends of the electroconducting threads are embedded in a layer of a heat-resisting and electrically insulating material.

16. A method as claimed in claim 15, wherein at least one layer of heat-resisting material in which the welded ends of the electroconducting threads are embedded is mechanically and thermally independent of said sheaths.

17. A method as claimed in claim 11, wherein after winding and/or folding, the woven strips are vacuum impregnated with a thermally and electrically insulating material of ceramic type, and the welded junctions are embedded in layers of insulating material of ceramic type.

* * * * *